(12) United States Patent
Orlando et al.

(10) Patent No.: US 12,373,564 B2
(45) Date of Patent: Jul. 29, 2025

(54) SECURE BOOT PROCEDURE

(71) Applicant: Micron Technology, Inc., Boise, ID (US)

(72) Inventors: Alessandro Orlando, Milan (IT); Niccolò Izzo, Vignate (IT); Angelo Alberto Rovelli, Agrate Brianza (IT); Danilo Caraccio, Milan (IT); Federica Cresci, Milan (IT); Craig A. Jones, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 124 days.

(21) Appl. No.: 18/237,229

(22) Filed: Aug. 23, 2023

(65) Prior Publication Data

US 2024/0070283 A1 Feb. 29, 2024

Related U.S. Application Data (60) Provisional application No. 63/400,746, filed on Aug. 24, 2022.

(51) Int. Cl.
  *G06F 15/177* (2006.01)
  *G06F 9/00* (2018.01)
  *G06F 21/57* (2013.01)

(52) U.S. Cl.
  CPC .......... *G06F 21/575* (2013.01); *G06F 21/572* (2013.01)

(58) Field of Classification Search
  CPC .. G06F 21/575; G06F 21/572; G06F 9/44505; G06F 9/44521
  See application file for complete search history.

(56) References Cited

U.S. PATENT DOCUMENTS

| | | | |
|---|---|---|---|
| 10,496,297 B2 | 12/2019 | Bahirat et al. | |
| 10,942,889 B2 | 3/2021 | Ramesh | |
| 11,609,997 B2* | 3/2023 | Tsai | G06F 21/44 |
| 2014/0059550 A1* | 2/2014 | Yoshihara | G06F 9/5016 |
| | | | 718/100 |
| 2018/0144136 A1* | 5/2018 | Nadarajah | G06F 21/575 |
| 2020/0036519 A1* | 1/2020 | Bitauld | H04L 9/0897 |
| 2021/0026647 A1* | 1/2021 | Warkentin | G06F 9/4401 |
| 2022/0179960 A1* | 6/2022 | Spangler | H04L 9/3239 |
| 2022/0207193 A1 | 6/2022 | Caraccio et al. | |
| 2023/0035801 A1* | 2/2023 | Campetti | H04L 63/0823 |
| 2025/0053659 A1* | 2/2025 | Asbe | H04L 9/0861 |

* cited by examiner

*Primary Examiner* — Xuxing Chen
(74) *Attorney, Agent, or Firm* — Brooks, Cameron & Huebsch, PLLC (57) ABSTRACT

Protection for a secure boot procedure can be provided in addition to cryptographic verification of boot firmware associated with the boot procedure. While the boot firmware is being verified and executed at a secure sub-system, an open sub-system can be put into a halt state, during which the open sub-system is prevented from performing the boot procedure. The open sub-system is still prevented from performing the boot procedure even if the boot firmware is verified and/or executed unless the open sub-system is put into the resume state again.

16 Claims, 5 Drawing Sheets

SECURE BOOT PROCEDURE

PRIORITY INFORMATION

This application claims the benefit of U.S. Provisional Application No. 63/400,746, filed on Aug. 24, 2022, the contents of which are incorporated herein by reference.

TECHNICAL FIELD

The present disclosure relates generally to semiconductor memory and methods, and more particularly, to apparatuses, systems, and methods for secure boot procedure.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Systems, apparatuses, and methods related to secure boot procedure are described. A boot procedure initiates responsive to start-up of a computing system, such as when a computing system is powered-up or restarted. During the boot procedure, integrated boot programs (e.g., firmware) built into the computing system are executed to initialize the computing system, run self-tests, and identify hardware/software resources of the computing system. Further, the boot programs may also perform operations to configure the hardware/software resources to further load and run an operating system for the computing system.

Boot programs (e.g., code) may be required to be verified prior to being executed during the boot procedure. Due to hardware/software resources of a secure component dedicated to the verification process being often limited, operation of the secure component may not be entirely independent of the other components of the computing system that may be relatively easily accessible by attackers. This can be exploited by attackers who can choose to take over a control of the other components, instead of the secure component, to eventually take over a control of the computing system during runtime of the boot procedure. This control can be obtained by the attackers when, for example, the attackers obtain secure boot code (which may have unknown vulnerability) and/or access to serial peripheral interface (SPI) NOR package (where the boot programs are stored). When the control of the computing system is undesirably obtained by the attackers, the attackers can instruct the computing system to bypass (e.g., ignore) the verification process and instruct the computing system to load and execute firmware (e.g., malicious firmware) implemented by the attacker. Runtime attacks can be performed at various times during system operation, which can include during secure boot procedure execution, and/or at various locations within the system, which can include at locations considered the Chain of Trust (CoT) or the Root of Trust (RoT). As used herein, the term "Chain of Trust (CoT)" refers to components of hardware (e.g., a computing system) and/or software that are ensured to have a certain level of trust (e.g., security) by requiring each component to be validated from the end point up to the root of trust (e.g., certificate). As used herein, the term "Root of Trust (RoT)" is a source for security of hardware or software. For example, the RoT can include a cryptographic key (one or more keys) that can be used for cryptographic operations (e.g., verifications) and a secure boot procedure of the hardware or software.

Embodiments described herein provides additional protection against runtime attacks by operating the secure component independently of the other components until the verification process is completed. In a number of embodiments, an open sub-system (that loads/executes a substantial portion of the boot firmware) can include a register that is accessible only by a secure sub-system (that verifies the boot firmware loaded to the open sub-system) and that can put the open sub-system in a particular operating state, in which the open sub-system is prevented from loading/executing the boot firmware. Meanwhile, the secure sub-system can be implemented with additional hardware/software resources to allow the secure sub-system to load, verify, and execute the boot firmware itself, which eliminates the need of the open sub-system in loading/executing the boot firmware while the boot firmware are being verified. When all of the boot firmware is verified, the open sub-system then can be allowed to execute the boot firmware so as to operate the secure sub-system independently of the open sub-system during the verification process, which makes attackers' efforts in taking over the control of the open sub-system meaningfulness.

In some embodiments, the memory system can be a compute express link (CXL) compliant memory system. The host interface can be managed with CXL protocols and be coupled to the host via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transmitted, received, or exchanged by electronic signals (e.g., current, voltage, etc.) and that the phrase "signal indicative of [data]" represents the data itself being transmitted, received, or exchanged in a physical medium.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 102-1, 102-2, 102-M in FIG. 1. Such analogous elements may be generally referenced without the hyphen and extra numeral or letter. For example, elements 102-1, 102-2, 102-M may be collectively referenced as 102. As used herein, the designators "M" and "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
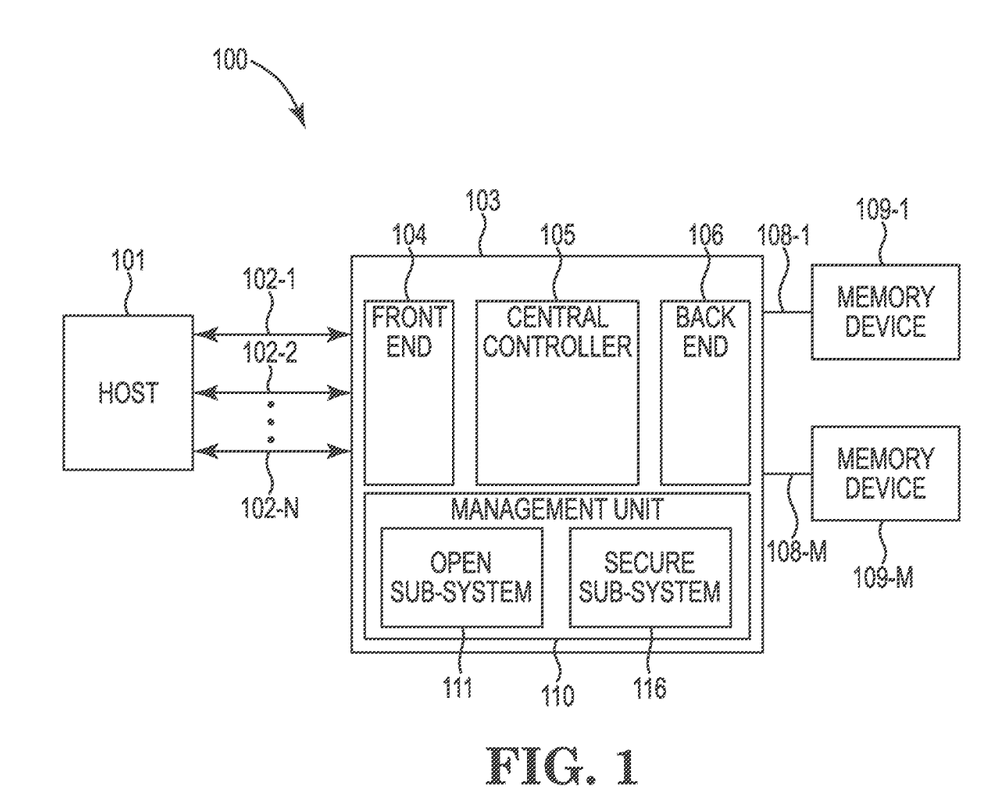
FIG. 1 is a functional block diagram of a computing system including a management unit for performing a secure boot procedure in accordance with a number of embodiments of the present disclosure.

FIG. 1 is a functional block diagram of a computing system including a management unit 110 for performing a secure boot procedure in accordance with a number of embodiments of the present disclosure. The memory controller 103 can include a front end portion 104, a central controller portion 105, and a back end portion 106. The computing system 100 can include a host 101 and memory devices 109-1, . . . , 109-N coupled to the memory controller 103.

The front end portion 104 includes an interface and interface management circuitry to couple the memory controller 103 to the host 101 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port. In at least one embodiment, the interface between the memory controller 103 and the host 101 can be a PCIe physical and electrical interface operated according to a CXL protocol.

The central controller portion 105 can include and/or be referred to as data management circuitry. The central controller portion 105 can control performance of a memory operation. Examples of the memory operation include a read operation to read data from a memory device 109 or a write operation to write data to a memory device 109.

The central controller portion 105 can further provide protection over data stored in the memory devices 109, such as a chip kill protection, in which the memory system can work properly even if a constituent chip, such as a memory device 109, is damaged; thereby, avoiding a situation of one of the chips being a single point of failure (SPOF) of the memory system. The chip kill protection that can be provided through various error correction code (ECC) schemes including a "Redundant Array of Independent Disks" (RAID) scheme, a low-power chip kill (LPCK) scheme, etc., which allow data recovery of the damaged chip by reading all of the constituent chips (e.g., the memory devices 109) of the computing system 100. The chip kill protection against any single memory device 109 (chip) failure and/or multi-bit error from any portion of a single memory chip can be implemented collectively across subsets of the memory devices 109 or across all of the memory devices 109.

The back end portion 106 can include a media controller and a physical (PHY) layer that couples the memory controller 103 to the memory devices 109. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 108-1, . . . , 108-N. The channels 108 can include various types of data buses, such as a sixteen-pin data bus and a two-pin data mask inversion (DMI) bus, among other possible buses.

An example of the memory devices 109 is dynamic random access memory (DRAM) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 109-1 is operated as an LPDDRx DRAM device with low-power features enabled and at least one of the memory devices 109-N is operated an LPDDRx DRAM device with at least one low-power feature disabled. In some embodiments, although the memory devices 109 are LPDDRx memory devices, the memory devices 109 do not include circuitry configured to provide low-power functionality for the memory devices 109 such as a dynamic voltage frequency scaling core (DVFSC), a sub-threshold current reduce circuit (SCRC), or other low-power functionality providing circuitry. Providing the LPDDRx memory devices 109 without such circuitry can advantageously reduce the cost, size, and/or complexity of the LPDDRx memory devices 109. By way of example, an LPDDRx memory device 109 with reduced low-power functionality providing circuitry can be used for applications other than mobile applications (e.g., if the memory is not intended to be used in a mobile application, some or all low-power functionality may be sacrificed for a reduction in the cost of producing the memory).

Another example of the memory devices 109 is non-volatile memory, such as ferroelectric random access memory (FeRAM) among others. The memory controller 103 can manage a DRAM memory device 109 and a FeRAM memory device 109. Further, in some embodiments, instead of managing both a DRAM memory device 109 and a FeRAM memory device 109, the memory controller 103 can be configured to manage either just volatile memory devices, such as DRAM memory devices 109, or just FeRAM memory devices 109.

In some embodiments, the memory controller 103 can include a management unit 110 to initialize, configure, and/or monitor characteristics of the memory controller 103. Further, the management unit 110 can be used to execute non-memory functions. Such examples can include logging, error reporting, support of discovery by the host, security protocols management, security functions, etc. In some embodiments, the management unit 110 can include an I/O bus to manage out-of-band data and/or commands, a management unit controller to execute one or more instructions associated with initializing, configuring, and/or monitoring the characteristics of the memory controller, and a management unit memory to store data associated with initializing, configuring, and/or monitoring the characteristics of the memory controller 103. As used herein, the term "out-of-band data and/or commands" generally refers to data and/or commands transferred through a transmission medium that is different from the main transmission medium of a network. For example, out-of-band data and/or commands can be data and/or commands transferred to a network using a different transmission medium than the transmission medium used to transfer data within the network.

Further, as illustrated in FIG. 1, the management unit 110 can include an open sub-system 111 and a secure sub-system 116 that are configured to initiate and/or perform a boot procedure. As used herein, the term "boot procedure" refers to a process of initializing a computing system from a halted and/or powered-down condition. The open sub-system 111 and the secure sub-system 116 can operate in conjunction with various firmware interfaces, such as Unified Extensible Firmware Interface (UEFI), Advanced Configuration and Power interface (ACM), Basic Input Output System (BIOS) interfaces, and/or custom Application Programming Interfaces (APIs), among others. In some embodiments, the boot procedure can be triggered by a reset or a power-cycle event of the management unit 110, for example. The management unit 110 can be capable of resetting itself without an external input.

The open sub-system 111 and the secure sub-system 116 can be configured for storing/loading (e.g., from the memory device 109) boot firmware. The open sub-system 211 can be configured for storing/loading (e.g., from the memory device 109) boot firmware and execute the boot firmware dedicated to initializing hardware resources, loading drivers for the resources, and/or performing operations as defined for the boot procedure.

The secure sub-system 116 can verify the boot firmware loaded to the secure sub-system 116 and/or the open sub-system 111 using computer-executable instructions (e.g., codes) and/or the firmware loaded from a memory (e.g., the non-volatile memory 221 illustrated in FIG. 2) and dedicated for verification. The secure sub-system 116 can perform a verification process on the boot firmware according to various cryptographic algorithms, such as Rivest-Shamir-Adleman (RSA), Elliptic-curve cryptography such as Elliptic Curve Digital Signature Algorithm (ECDSA), Elliptic-curve Diffie-Hellman (ECDH), Edwards-curve Digital Signature Algorithm (EdDSA), Paillier cryptosystem, Cramer-Shoup cryptosystem, YAK authenticated key agreement protocol, Advanced Encryption Standard (AES), Twofish algorithm, Blowfish algorithm, International Data Encryption Algorithm (IDEA), MD5 (MD5 message-digest algorithm), Hash-based message authentication code (HMAC), or any combination thereof.

Both sub-systems (e.g., the open sub-system 111 and the secure sub-system 116) can directly access the memory (e.g., the non-volatile memory 221 illustrated in FIG. 2) via respective interfaces to load boot firmware stored in the memory. The non-volatile memory 221 illustrated in FIG. 2 can be a memory configured as a "boot sector", which can be configured for storing boot firmware. As used herein, the term "boot firmware" is computer-executable codes that controls a computing system from the time that it is turned on until the primary operating system has taken control of the machine. For example, the boot firmware can be executed to load and/or verify other boot firmware until the primary operating system has taken control of the computing system 100.

Although embodiments are not so limited, the memory 221 can be coupled to the management unit 110 (e.g., the secure sub-system 116) via an SPI. In one example, both sub-systems can access the memory. In another example, just one of the sub-systems (e.g., secure sub-system 116) can be allowed to access the memory, while the other sub-system (e.g., open sub-system 111) is prevented from accessing the memory.

Figure 2:
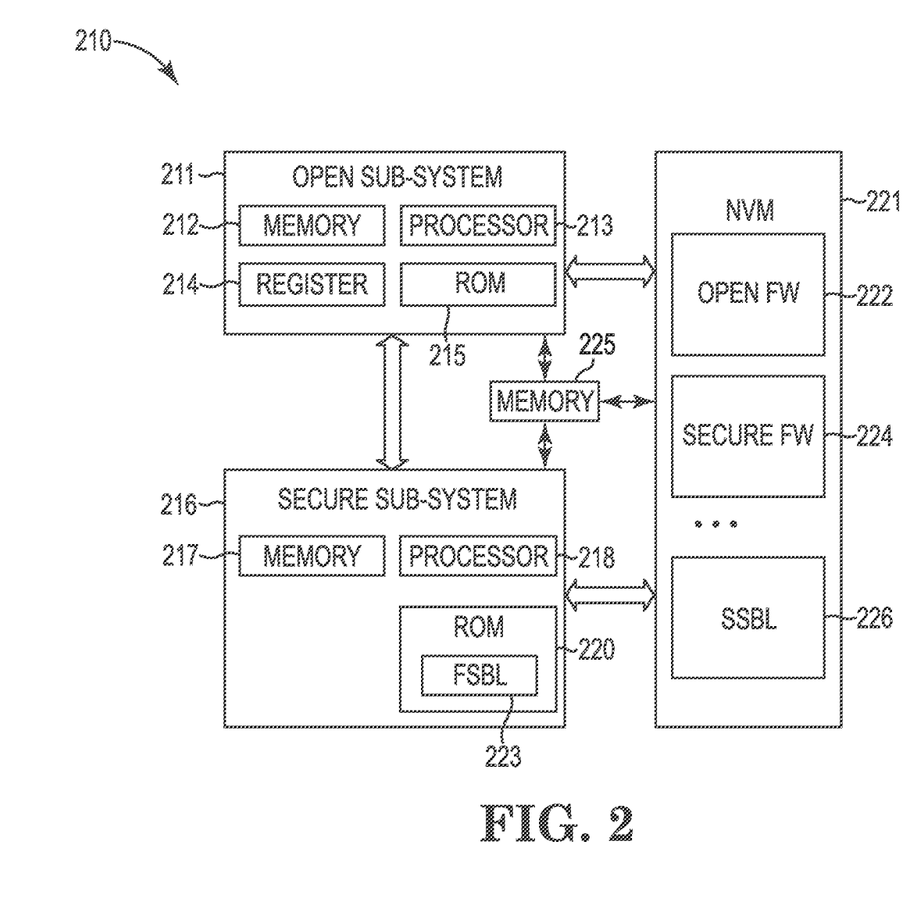
FIG. 2 is a functional block diagram of a management unit including an open sub-system, a secure sub-system, and a non-volatile memory configured to perform a secure boot procedure in accordance with a number of embodiments of the present disclosure.

FIG. 2 is a functional block diagram of a portion of a system that includes an open sub-system 211, a secure sub-system 216, and a non-volatile memory 221 configured to perform a secure boot procedure in accordance with a number of embodiments of the present disclosure. In this example, the open sub-system 211 and the secure sub-system 216 are part of a management unit 210, which can be a management unit such as 110 shown in FIG. 1; however, embodiments are not so limited. For example, one or both of the sub-systems 211 and 216 may not be located on a controller of a memory system.

As illustrated in FIG. 2, the open sub-system 211 can include a memory 212, a processor 213 (e.g., CPU), a register 214, and a read-only memory (ROM) 215. The open sub-system 211 can be accessed by another approved sub-system, such as the secure sub-system 216. Although embodiments are not so limited, the memory 212 can be a volatile memory.

The ROM 215 is configured for storing instructions (immutable codes) to perform a boot procedure. For example, the instructions stored in the ROM 215 can execute boot firmware, such as the open firmware 222.

A binary value of the register 214 can be used to indicate which one of two states (e.g., "1" or "0"), for example, the open sub-system 211 is in during a boot procedure. As an example, a first state (e.g., indicated by a binary "1") can be referred to as a "resume" state of the open sub-system 211 and can correspond to a state in which the open sub-system 211 is allowed to execute (or resume execution of) the boot procedure, which can include loading and/or executing boot firmware from the non-volatile memory 221 and/or the memory 212. On the other hand, a second state (e.g., indicated by a binary "0") can be referred to as a "halt" state of the open sub-system 211 and can correspond to state in which the open sub-system 211 is prevented from further performance/execution of the boot procedure. For example, the open sub-system 211 in the halt state is prevented from further executing bootloaders and/or firmware loaded to the memory 212. When the open sub-system 211 is placed into the halt state, the open sub-system 211 can save the current state (how far the boot procedure has been performed) so as to resume execution of the boot procedure from the point just prior to the open sub-system 211 being placed into the halt state, which can avoid the open sub-system 211 from having to restart the boot procedure. The secure sub-system 216 can access and set the register 214, while the open sub-system 211 may not have such access to the register 214.

As illustrated in FIG. 2, the secure sub-system 216 can include a memory 217, a processor 218 (e.g., CPU), and a ROM 220. The secure sub-system 216 can be configured for storing cryptographic information (e.g., cryptographic keys, such as public and/or private keys) to be used in association with verifying firmware to be executed during a boot procedure. Access to the cryptographic information stored in the secure sub-system can be limited/restricted unless the access is from the secure sub-system itself. The cryptographic information can be stored in the memory 217 and/or the ROM 220.

The ROM 220 can be an immutable non-volatile memory that is configured for storing instructions (e.g., immutable codes) that can be executed by the processor 218, such as first stage bootloader (FSBL) 223, to perform the boot procedure. When the FSBL 223 is executed, the FSBL 223 loads the other boot firmware (e.g., cause the other boot firmware to be loaded), such as second stage boot loader (e.g., SSBL 226), to the memory 220. The management unit 210 (e.g., as part of the memory controller 103 illustrated in FIG. 1) when shipped from a manufacturer to a customer, such as an end user, organization, or service provide, may have the FSBL 223 already stored in the ROM 220. The FSBL (e.g., the FSBL 223) is ROM-based boot firmware to initially load other boot firmware to the open sub-system 211 and/or the secure sub-system 216 during the boot procedure.

The ROM 220 can be further configured for storing instructions (e.g., immutable codes) to provide secure functionalities, such as cryptographically verifying the firmware loaded to the open sub-system 211 and/or the secure sub-system 216. The ROM 220 can further be configured for storing cryptographic information (e.g., cryptographic keys, such as public and/or private keys) to be used in association with verifying boot firmware (e.g., SSBL 226, open firmware 222, and/or secure firmware 224) to be executed during a boot procedure. In some embodiments, the cryptographic information can be provided by a manufacturer and be immutable throughout the usage of the secure sub-system in conjunction with the boot procedure.

As described herein, the non-volatile memory 221 can be a memory coupled to the management unit 110 via an SPI, for example. The non-volatile memory 221 can be configured as a "boot sector" configured for storing boot firmware such as open firmware 222, secure firmware 224, and second stage bootloader (SSBL) 226. The SSBL 226 can be loaded to the memory 217 to be executed. When executed, the SSBL 226 can load the secure firmware 224 to the memory 217. In some embodiments, the FSBL 223 can initialize, when executed, hardware resources of the computing system.

The secure firmware 224 is designed to ensure secure verification/execution of the open firmware 222. For example, the secure firmware 224, when executed, can verify the open firmware 222. As used herein, the term "open firmware" is a (e.g., proprietary or nonproprietary) boot firmware that is usable on various types of processors and buses to implement services, protocols, and functionalities required for the memory controller (e.g., the memory controller 100 as illustrated in FIG. 1) to operate as intended. In an example, where an operating system is needed to be loaded, the open firmware can further perform operations (e.g., read and/or write operations) to load and run the operating system for the computing system.

A boot procedure can be a multi-stage procedure, in which respective firmware can be executed in each stage. The process of this multi-stage boot procedure can be further controlled by the secure sub-system 216. For example, prior to moving onto a next stage, the secure sub-system 216 can put the open sub-system 211 into a particular operating state to prevent the open sub-system 211 from performing the boot procedure, which can include preventing the open sub-system 211 from loading (e.g., from the non-volatile memory 221) and/or executing boot firmware. While the open sub-system 211 is put into the particular operating state, the boot procedure can be performed by the secure sub-system 216, which can load the boot firmware (e.g., the SSBL 226, the secure firmware 224, and the open firmware 222) from the non-volatile memory 221 and verify the boot firmware (e.g., the SSBL 226, the secure firmware 224, and/or the open firmware 222) and/or execute the boot firmware (the SSBL 226 and the secure firmware 224) in lieu of the open sub-system 211. The SSBL 226, the secure firmware 224, and the open firmware 222 can be loaded to the secure sub-system 216 in a particular sequence during a boot procedure and can be executed once verified by the secure sub-system 216. For example, they can be loaded to the memory 217 of the secure sub-system 216 in an order of the SSBL 226, the secure firmware 224, and the open firmware 222. Once the boot firmware (e.g., the SSBL 226, the secure firmware 224, and the open firmware 222) is successfully verified in the secure sub-system 216, the secure sub-system 216 can put the open sub-system 211 to a different operating state to allow the open sub-system 211 to perform the boot procedure, which can include executing the open firmware 222.

In a non-limiting example, an apparatus (e.g., the secure sub-system 216 illustrated in FIG. 2) can include a processor (e.g., the processor 218 illustrated in FIG. 2). The apparatus further includes a first memory (e.g., the memory 212 illustrated in FIG. 2) coupled to the processor. The apparatus further includes a second memory (e.g., the ROM 220 illustrated in FIG. 2) coupled to the processor and configured for storing instructions executable by the processor. The instructions, when executed by the processor, can cause the processor to set, in response to initiation of a boot procedure, a register (e.g., the register 214 illustrated in FIG. 2) of a first sub-system (e.g., the open sub-system 111 and 211 illustrated in FIGS. 1 and 2, respectively) to a first value to prevent the first sub-system from loading or executing first firmware (e.g., the SSBL 226 and 326 illustrated in FIGS. 2 and 3, respectively) to be executed during the boot procedure. The instructions can further cause the instructions to load the first firmware from a non-volatile memory (e.g., the non-volatile memory 221 illustrated in FIG. 2) to the first memory to verify the first firmware. The instructions can further cause to the processor to execute the first firmware in response to the first firmware being verified to load second firmware (e.g., open firmware 222 and 322 illustrated in FIGS. 2 and 3, respectively) to the first memory and load the second firmware from the non-volatile memory to the first memory to verify the second firmware. In response to the second firmware being verified, the instructions can further cause the processor to set the register of the first sub-system to allow the first sub-system to execute the second firmware. In some embodiments, the non-volatile memory can be configured as a boot sector for storing boot firmware.

In some embodiments, the apparatus can be directly coupled to the non-volatile memory and the instructions further cause the processor to load the first firmware or the second firmware, or both, from the non-volatile memory directly to the first memory. Further, the first sub-system can be directly coupled to the non-volatile memory and the instructions further cause the processor to load the first firmware or the second firmware, or both, from the non-volatile memory directly to the first memory.

Figure 3:
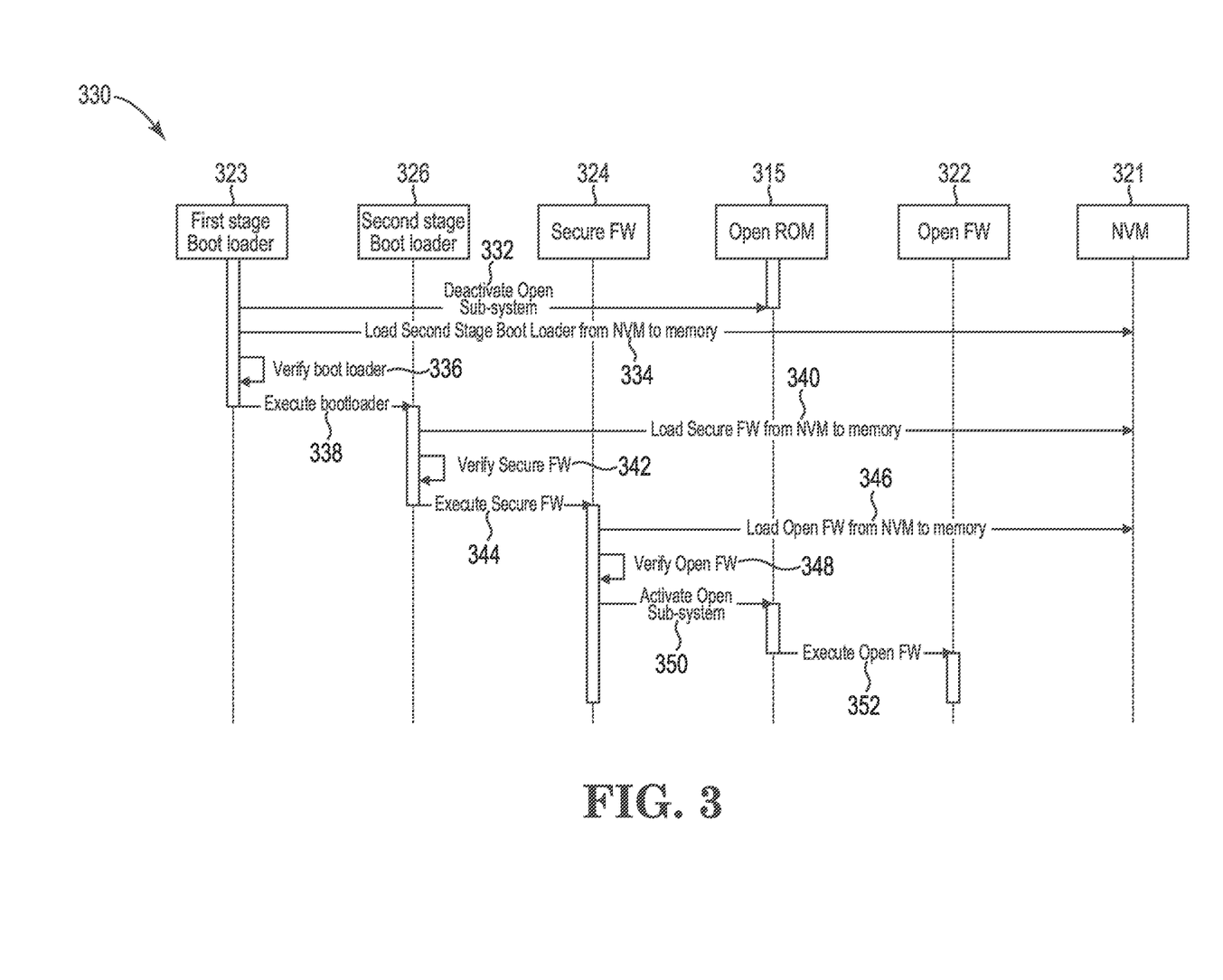
FIG. 3 is a sequence diagram illustrating the performance of a secure boot procedure in accordance with a number of embodiments of the present disclosure.

In some embodiments, at least a portion of the instructions corresponds to a first bootloader (e.g., the FSBL 223 and 323 illustrated in FIGS. 2 and 3, respectively) and the first firmware corresponds to a second bootloader firmware (e.g., the SSBL 226 and 326 illustrated in FIGS. 2 and 3, respectively). In this example, the instructions further cause the processor to load secure firmware (e.g., the secure firmware 224 and 324 illustrated in FIGS. 2 and 3, respectively) to the first memory from the non-volatile memory as a result of the execution of the second bootloader, verify the secure firmware, and execute, in response to the secure firmware being verified, the secure firmware to load the second firmware to the first memory and verify the second firmware.

FIG. 3 is a sequence diagram illustrating the execution (e.g., alternatively referred to as performance) of a boot procedure in accordance with a number of embodiments of the present disclosure. A first stage bootloader (FSBL) 323, a second stage bootloader (SSBL) 326, secure firmware 324, a ROM 315, open firmware 322, and a non-volatile memory 321 are analogous to the FSBL 223, SSBL 226, secure firmware 224, ROM 215, open firmware 222, and non-volatile memory 221 illustrated in FIG. 2, respectively.

At 332, a signal to set a register (e.g., the register 214) to a first value (e.g., "0") can be sent to the open sub-system 211 from the secure sub-system 216 to put the open sub-system 211 into a first state (e.g., deactivate the open sub-system 211), in which the open sub-system 211 can be prevented from loading/executing boot firmware. At 334, the FSBL 323 (e.g., which can be stored within a ROM of a secure sub-system as illustrated in FIG. 2) can be executed to load the SSBL 326 to the secure sub-system 216 (e.g., the memory 217 of the secure sub-system 216 illustrated in FIG. 2). At 336, the SSBL 326 can be verified by execution of the FSBL 323 stored in a ROM of the secure sub-system (e.g., ROM 220 of secure sub-system 216 shown in FIG. 2). Once verified, at 338, the SSBL 326 can be instructed by the FSBL 323 to be executed.

At 340, the SSBL 326 can be executed to load the secure firmware 324 to the secure sub-system 216 (e.g., the memory 217 of the secure sub-system 216 illustrated in FIG. 2). At 342, the secure firmware 324 can be verified at the secure sub-system 216. Once verified, at 344, the secure firmware 324 can be instructed by the SSBL 326 to be executed.

At 346, the secure firmware 324 can be executed to load the open firmware 322 to a memory 225 (e.g., alternatively referred to as "shared memory") that is accessible by both the open sub-system 211 and the secure sub-system 216. At 348, the secure firmware 324 can be further executed to verify the open firmware 322.

Once verified, at 350, a signal to set a register (e.g., the register 214) to a second value (e.g., "1") can be sent to the open sub-system 211 from the secure sub-system 216 to put the open sub-system 211 into a second state (e.g., activate the open sub-system 211), in which the open sub-system 211 can be allowed to execute boot firmware. At 352, the instructions stored in the ROM 315 (e.g., cause the processor 213 to) execute the open firmware 322 from the shared memory 225 (to which the open firmware 322 was previously loaded). Although one open firmware is illustrated as being executed by the open sub-system 211, there can be multiple and different types of open firmware to be executed by the open sub-system 211. In this example, the open sub-system 211 can be prevented from being put into the second state until each one of the open firmware is verified at the secure sub-system 216.

In a non-limiting example, a system (e.g., the management unit 110 illustrated in FIG. 1) can include a first sub-system (e.g., the open sub-system 211 illustrated in FIG. 2) including a boot control register. The system can further include a second sub-system (e.g., the secure sub-system 216 illustrated in FIG. 2) including a first memory (e.g., the ROM 220 illustrated in FIG. 2) configured for storing a first bootloader (e.g., the FSBL 223 and 323 illustrated in FIGS. 2 and 3, respectively) and a second memory (e.g., the memory 212 illustrated in FIG. 2). The system can further include a non-volatile memory (e.g., the non-volatile memory 221 illustrated in FIG. 2) communicatively coupled to the first sub-system and the second sub-system. The non-volatile memory can be configured for storing a second bootloader, secure firmware, and open firmware (e.g., the SSBL 226 and 326, secure firmware 224 and 324, and open firmware 222 and 322 illustrated in FIGS. 2 and 3, respectively). In some embodiments, the first sub-system and the second sub-system each can be a respective central processing unit (CPU).

The second sub-system can be configured to set, in response to receipt of initiation of a boot procedure, the boot control register to a first value to put the first sub-system into a first state and to prevent the first sub-system from executing firmware associated with the boot procedure. The second sub-system can be further configured to execute the first bootloader to load the second bootloader from the non-volatile memory to the second memory. The second sub-system can be further configured to execute, in response to the second bootloader being cryptographically verified, the second bootloader to load the secure firmware from the non-volatile memory to the second memory. The second sub-system can be further configured to execute, in response to the boot control register being set to a second value upon the secure firmware being cryptographically verified, the secure firmware to load the open firmware from the non-volatile memory to a third memory accessible by the first sub-system to execute the open firmware in response to the open firmware being cryptographically verified.

In some embodiments, the second sub-system can be configured to load the open firmware to from the non-volatile memory to the third memory. In some embodiments, the second sub-system can be configured to load the second bootloader from the non-volatile memory directly to the second memory as a result of the execution of the first bootloader. In some embodiments, the second sub-system can be configured to load the second bootloader from the non-volatile memory directly to the second memory as a result of the execution of the first bootloader.

Figure 4:
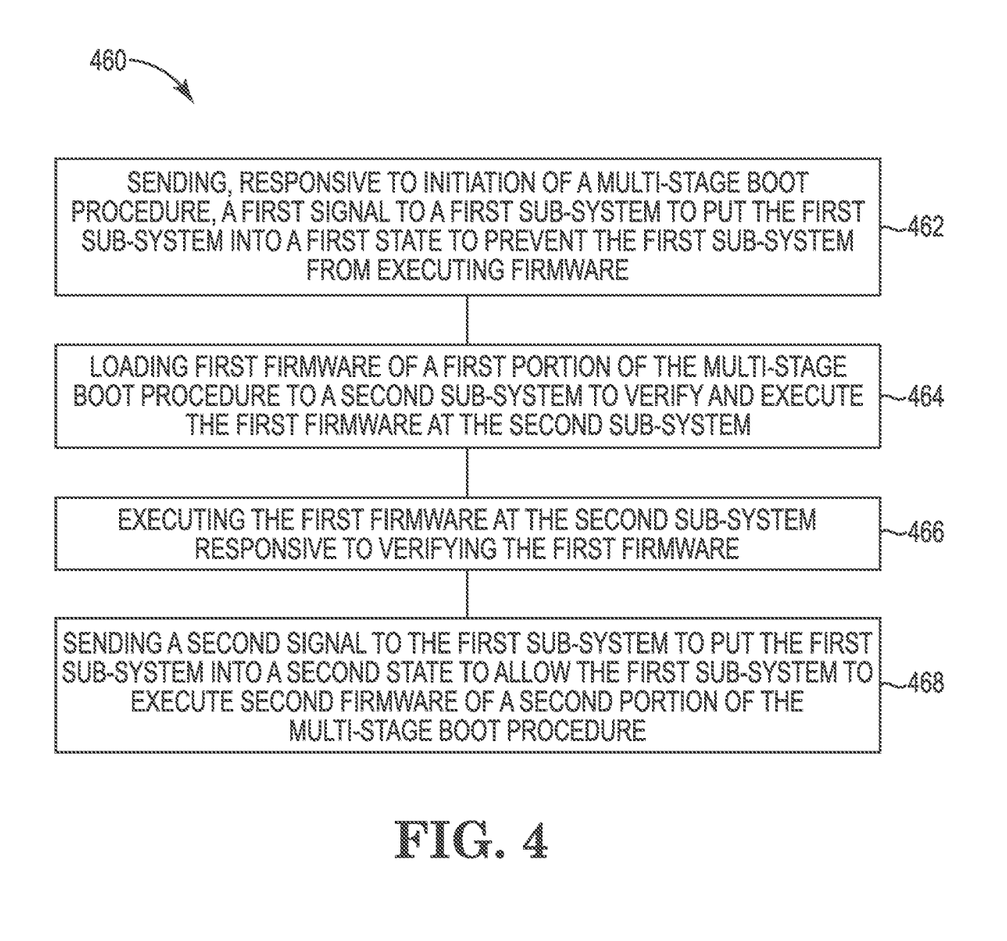
FIG. 4 is a flow diagram of a method for performing a secure boot procedure in accordance with a number of embodiments of the present disclosure.

FIG. 4 is a flow diagram of a method 460 for performing a secure boot procedure in accordance with a number of embodiments of the present disclosure. The method 460 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 460 is performed by the management unit 110 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 462, a first signal can be sent to a first sub-system (e.g., the open sub-system 111 and 211 illustrated in FIGS. 1 and 2, respectively) responsive to initiation of a multi-stage boot procedure to put the first sub-system into a first state to prevent the first sub-system from executing firmware. At 464, first firmware (e.g., the SSBL 226 and 326 illustrated in FIGS. 2 and 3, respectively) of a first portion of the multi-stage boot procedure can be loaded to a second sub-system (e.g., the secure sub-system 116 and 216 illustrated in FIGS. 1 and 2, respectively) to verify and execute the first firmware at the second sub-system. The first firmware can be loaded directly to the second sub-system. For example, the first firmware can be loaded directly to the second sub-system without loading through the first sub-system.

At 466, the first firmware can be executed at the second sub-system responsive to verifying the first firmware. At 468, a second signal can be sent to the first sub-system to put the first sub-system into a second state to allow the first sub-system to execute second firmware (e.g., open firmware 222 and 322 illustrated in FIGS. 2 and 3, respectively) of a second portion of the multi-stage boot procedure.

In some embodiments, the second firmware can be loaded to the second sub-system prior to sending the second signal to the first sub-system. In this example, the second sub-system can be verified at the second sub-system and the second signal can be sent to the first sub-system responsive to verifying the second firmware.

In some embodiments, a register (e.g., the register 214 illustrated in FIG. 2, respectively) of the first sub-system can be set to a first value to put the first sub-system into the first state by sending the first signal to the first sub-system. Further, the register of the first sub-system can be set to a second value to put the first sub-system into the second state by sending the second signal to the first sub-system.

Figure 5:
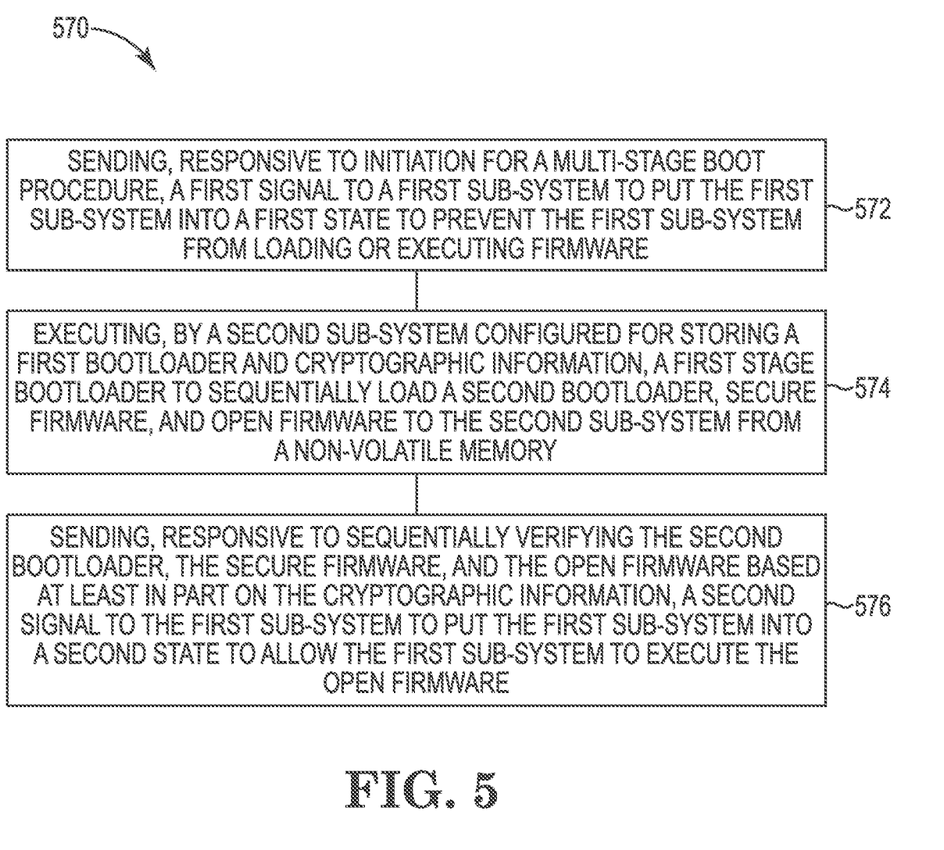
FIG. 5 is a flow diagram of a method for performing a secure boot procedure in accordance with a number of embodiments of the present disclosure.

FIG. 5 is a flow diagram of a method 570 for performing a secure boot procedure in accordance with a number of embodiments of the present disclosure. The method 570 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 570 is performed by the management unit 110 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 572, a first signal can be sent to a first sub-system (e.g., the open sub-system 111 and 211 illustrated in FIGS. 1 and 2, respectively) to put the first sub-system into a first state responsive to initiation of a multi-stage boot procedure to prevent the first sub-system from loading or executing firmware. At 574, a first stage bootloader (e.g., the FSBL 223 and 323 illustrated in FIGS. 2 and 3, respectively) can be executed by a second sub-system (e.g., the secure sub-system 116 and 216 illustrated in FIGS. 1 and 2, respectively) configured for storing a first bootloader and cryptographic information to sequentially load a second bootloader, secure firmware, and open firmware (e.g., the SSBL 226 and 326, secure firmware 224 and 324, and open firmware 222 and 322 illustrated in FIGS. 2 and 3, respectively) to the second sub-system from a non-volatile memory (e.g., the non-volatile memory 221 illustrated in FIG. 2). At 576, a second signal can be sent to the first sub-system responsive to sequentially verifying the second bootloader, the secure firmware, and the open firmware based at least in part on the cryptographic information to put the first sub-system into a second state to allow the first sub-system to execute the open firmware.

In some embodiments, the first stage bootloader can be executed to sequentially load the second bootloader, the secure firmware, and the open firmware to the second sub-system from the non-volatile memory by loading the second bootloader to the second sub-system by executing the first stage bootloader, verifying the second bootloader based at least in part on the cryptographic information, and executing the second bootloader to load the secure firmware to the second sub-system responsive to verifying the second bootloader. Further, the second bootloader can be executed to load the secure firmware to the second sub-system further by loading the secure firmware to the second sub-system by executing the second bootloader, verifying the secure firmware based at least in part on the cryptographic information, and executing the secure firmware to load the open firmware to the second sub-system responsive to verifying the second bootloader. In some embodiments the open firmware can be executed by executing the secure firmware. The open firmware can be executed by the first sub-system responsive to verifying the secure firmware.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
sending, responsive to initiation of a multi-stage boot procedure, a first signal to a first sub-system to put the first sub-system into a first state to prevent the first sub-system from executing firmware;
executing a first bootloader to load a second bootloader of a first portion of the multi-stage boot procedure to a second sub-system;
executing the second bootloader at the second sub-system responsive to verifying the second bootloader and to load secure firmware;
executing, responsive to verifying the secure firmware, the secure firmware to load the open firmware to the second sub-system;
sending, responsive to verifying the open firmware, a second signal to the first sub-system to put the first sub-system into a second state to allow the first sub-system to execute open firmware of a second portion of the multi-stage boot procedure; and
executing, while the first sub-system is in the second state, the open firmware.

2. The method of claim 1, further comprising:
setting, by sending the first signal to the first sub-system, a register of the first sub-system to a first value to put the first sub-system into the first state; and
setting, by sending the second signal to the first sub-system, the register of the first sub-system to a second value to put the first sub-system into the second state.

3. The method of claim 1, further comprising loading the second bootloader directly to the second sub-system.

4. The method of claim 3, further comprising loading the second bootloader directly to the second sub-system without loading through the first sub-system.

5. The method of claim 1, wherein:
secure firmware is loaded to the second sub-system as a result of executing the first firmware; and
the method further comprises:
verifying the secure firmware at the second sub-system; and
executing the secure firmware to load the second firmware to the second sub-system.

6. The method of claim 5, further comprising verifying the first firmware or the secure firmware based at least in part on cryptographic information stored on the second sub-system.

7. An apparatus, comprising:
a processor;
a first memory coupled to the processor; and
a second memory coupled to the processor and configured for storing instructions corresponding to a first bootloader and executable by the processor, wherein the instructions, when executed by the processor, cause the processor to:
set, in response to initiation of a boot procedure, a register of a first sub-system to a first value to prevent the first sub-system from loading or executing a second bootloader to be executed during the boot procedure;
load the second bootloader from a non-volatile memory to the first memory to verify the second bootloader;
execute the second bootloader in response to the second bootloader being verified to load secure firmware to the first memory;
execute, in response to the secure firmware being verified, the secure firmware to load the open firmware to the first memory and verify the open firmware;
and
set, in response to the open firmware being verified, the register of the first sub-system to allow the first sub-system to execute the open firmware.

8. The apparatus of claim 7, wherein the apparatus is directly coupled to the non-volatile memory and the instructions further cause the processor to load the second bootloader or the open firmware, or both, from the non-volatile memory directly to the first memory.

9. The apparatus of claim 7, wherein the first sub-system is directly coupled to the non-volatile memory and the instructions further cause the processor to load the second bootloader or the open firmware, or both, from the non-volatile memory directly to the first memory.

10. The apparatus of claim 7, wherein the non-volatile memory is configured as a boot sector for storing boot firmware.

11. A system, comprising:
a first sub-system comprising a boot control register;
a second sub-system comprising:
a first memory configured to store a first bootloader; and
a second memory; and
a non-volatile memory communicatively coupled to the first sub-system and the second sub-system, the non-volatile memory configured to store a second bootloader, secure firmware, and open firmware;
wherein the second sub-system is configured to:
set, in response to initiation of a boot procedure, the boot control register to a first value to put the first sub-system into a first state and to prevent the first sub-system from executing firmware associated with the boot procedure;
execute the first bootloader to load the second bootloader from the non-volatile memory to the second memory;
execute, in response to the second bootloader being cryptographically verified, the second bootloader to load the secure firmware from the non-volatile memory to the second memory; and
execute, in response to the boot control register being set to a second value upon the secure firmware being cryptographically verified, the secure firmware to load the open firmware from the non-volatile memory to a third memory accessible by the first sub-system and cause the first sub-system to execute the open firmware in response to the open firmware being cryptographically verified.

12. The system of claim 11, wherein the second sub-system is configured to load the open firmware to from the non-volatile memory directly to the third memory as a result of the execution of the secure firmware.

13. The system of claim 11, wherein the second sub-system is configured to load the second bootloader from the non-volatile memory directly to the second memory as a result of the execution of the first bootloader.

14. The system of claim 11, wherein the second sub-system is configured to load the second bootloader from the non-volatile memory directly to the second memory as a result of the execution of the first bootloader.

15. The system of claim 11, wherein the first sub-system and the second sub-system each comprises a respective central processing unit (CPU).

16. The system of claim 11, wherein the first memory is a read-only memory (ROM).

* * * * *